United States Patent
Takahashi et al.

(10) Patent No.: US 9,867,385 B2
(45) Date of Patent: Jan. 16, 2018

(54) METHOD OF PROCESSING GREEN COFFEE BEANS

(75) Inventors: Kenzo Takahashi, Kawasaki (JP); Yoshikiyo Minami, Kawasaki (JP); Yoshiyuki Kanabuchi, Aichi (JP); Keiko Togami, Takatsuki (JP); Morio Mitsuhashi, Kawasaki (JP)

(73) Assignee: Suntory Beverage & Food Limited, Tokyo (JP)

( * ) Notice: Subject to any disclaimer, the term of this patent is extended or adjusted under 35 U.S.C. 154(b) by 1711 days.

(21) Appl. No.: 10/573,373

(22) PCT Filed: Sep. 22, 2004

(86) PCT No.: PCT/JP2004/013793
§ 371 (c)(1),
(2), (4) Date: Feb. 21, 2007

(87) PCT Pub. No.: WO2005/029969
PCT Pub. Date: Apr. 7, 2005

(65) Prior Publication Data
US 2007/0190207 A1  Aug. 16, 2007

(30) Foreign Application Priority Data
Sep. 25, 2003  (JP) .................. 2003-333754

(51) Int. Cl.
*A23F 5/24* (2006.01)
*A23F 5/02* (2006.01)

(52) U.S. Cl.
CPC ............... *A23F 5/246* (2013.01); *A23F 5/02* (2013.01); *A23F 5/243* (2013.01)

(58) Field of Classification Search
CPC .................................. A23F 5/163; A23F 5/204
See application file for complete search history.

(56) References Cited

U.S. PATENT DOCUMENTS 1,313,209 A * 8/1919 Robison .......................... 426/45
1,376,870 A * 5/1921 Graff et al. ..................... 426/45
(Continued)

FOREIGN PATENT DOCUMENTS

EP   0 837 126 A2   4/1998
JP   50-88267       7/1975
(Continued)

OTHER PUBLICATIONS

Mori 1999, JP 11043390 Derwent Abstract 2 pages.*
(Continued)

*Primary Examiner* — Felicia C Turner
(74) *Attorney, Agent, or Firm* — The Webb Law Firm

(57) ABSTRACT

The invention provides a method of processing green coffee beans that improves the aromas and flavors of green coffee beans through simple means, allowing richly fragrant green coffee beans that have unique aromas to be obtained with ease. A method of processing green coffee beans includes a fermentation process by bringing green coffee beans, which are unground seeds from coffee berries, microorganisms, and nutritive substances that are metabolized by the microorganisms into contact with one another to cause fermentation, followed by a separation process of separating out only said green coffee beans that have passed through the fermentation process.

6 Claims, 1 Drawing Sheet

(56) References Cited

U.S. PATENT DOCUMENTS

| | | | |
|---|---|---|---|
| 1,496,932 A | | 6/1924 | Gross |
| 2,027,801 A | | 1/1936 | Wilder |
| 2,321,148 A | | 6/1943 | Kirby et al. |
| 2,341,724 A | | 2/1944 | Kennedy |
| 2,526,872 A | | 10/1950 | Johnston et al. |
| 2,526,873 A | | 10/1950 | Johnston et al. |
| 2,607,690 A | | 8/1952 | Johnston et al. |
| 3,373,041 A | | 3/1968 | Bloom et al. |
| 4,161,549 A | | 7/1979 | Ohno |
| 4,867,992 A | * | 9/1989 | Boniello et al. ............... 426/45 |
| 4,970,082 A | * | 11/1990 | Huige et al. ................... 426/16 |
| 5,034,609 A | | 7/1991 | Satake et al. |
| 5,267,507 A | * | 12/1993 | Enomoto ....................... 99/286 |
| 5,773,065 A | | 6/1998 | Clauzure |
| 6,054,162 A | * | 4/2000 | Bradbury et al. ......... 426/330.3 |
| 6,482,959 B1 | | 11/2002 | Baloghne et al. |
| 6,660,322 B2 | * | 12/2003 | Zapp et al. ................... 426/631 |
| 2002/0081363 A1 | | 6/2002 | Zapp et al. |
| 2004/0005381 A1 | * | 1/2004 | Okada ............................ 426/11 |
| 2004/0086609 A1 | * | 5/2004 | Pazik et al. ................... 426/231 |
| 2004/0180112 A1 | * | 9/2004 | Hagiwara ...................... 426/11 |
| 2005/0019474 A1 | | 1/2005 | Miljkovic |

FOREIGN PATENT DOCUMENTS

| | | |
|---|---|---|
| JP | 51-12969 | 1/1976 |
| JP | 1-112950 A | 5/1989 |
| JP | 4-23992 A | 1/1992 |
| JP | 4-278072 A | 10/1992 |
| JP | 5-161488 A | 6/1993 |
| JP | 10-113163 A | 5/1998 |
| JP | 11-9190 A | 1/1999 |
| JP | 11-43390 A | 2/1999 |
| JP | 9502099 A1 | 2/2000 |
| JP | 2003-146897 A | 5/2003 |
| WO | 2004098303 A1 | 11/2004 |
| WO | 2004098320 A1 | 11/2004 |

OTHER PUBLICATIONS

Betancourt L.E. et al., 'Bedingungen des mikrobiellen Verderbs von gruenem Kaffee.1. Mitterung: Sorptionsverhalten und Schimmel bildung', Dtsch Lebensm Rundsch, 1983, vol. 79, No. 11, pp. 366 to 369.

Avallone S. et al., 'Fate of Mucilage Cell Wall Polysaccharides during Coffee Fermentation', J. Agric. Food Chem., 2001, vol. 49, No. 11, pp. 5556 to 5559.

Naito M., 'Hakkoshita Seisen Coffee Mame, Daizu Oyobi Komenuka Extract no Ko-Atherome Keisei Koka', Food Sci. Technol.Res., May 2003, vol. 9, No. 2, pp. 170 to 175.

Avallone et al.; "Microbiological and Biochemical Study of Coffee Fermentation"; Current Microbiology; 2001; pp. 252-256; vol. 42; Springer-Verlag; New York.

Agate et al.; "Role of Pectinolytic Yeasts in the Degradation of Mucilage Layer of Coffea robusta Cherries"; Applied Microbiology; Mar. 1966; pp. 256-260; vol. 14, No. 2; American Society for Microbiology.

* cited by examiner

METHOD OF PROCESSING GREEN COFFEE BEANS

TECHNICAL FIELD

The present invention relates to methods of processing green coffee beans, roasted coffee beans that are obtained by roasting the green coffee beans produced by those processing methods, and coffee beverages that are obtained from those roasted coffee beans.

BACKGROUND ART

The term "coffee bean" collectively refers to the seeds (coffee seeds) that are obtained by the process (refining process) of removing the pulp and the skin from the berries (known as coffee berries or coffee cherries) of *Coffea* plants of the family Rubiaceae and the beans that are produced from these. Of these, "green" coffee beans are coffee beans that have not yet passed through a roasting process, which is a process in which the coffee beans are roasted by heating, and "roasted" coffee beans are coffee beans that have been roasted.

The roasted coffee beans are ground and then infused with hot water, or an extraction liquid such as water, that is extracted by filtration using a filter material such as filter paper or mesh, and the extract that is obtained is taken as a coffee beverage.

The demand for coffee beverages as pleasure beverages continues to grow and diversify. For this reason, there is an interest in diverse coffee beverage products that for example have different flavors and aromas than conventional coffee beverages. Accordingly, it is desirable that the flavors and aromas of coffee beverages are improved so that many types of products may be produced.

One conceivable way to improve the flavor and aroma of coffee beverages is to improve the flavor and aroma of the coffee beans. For example, one feasible way to improve the flavor and aroma of coffee beans is to change to the heating temperature, heating time, and pressure, etc. in various ways during roasting, and in fact, coffee beans having good flavor and aroma have been produced in this way.

Simply changing the various conditions under which roasting is carried out, however, is not sufficient to improve the flavor and aroma of the coffee beans.

Accordingly, it was thought that the flavor and aroma of coffee beverages can be improved by adding flavor and aroma components to coffee beans that have already been roasted (see Patent Document 1).

Specifically, ground green coffee beans are inoculated with and fermented by *Aspergillus oryzae* and then roasted, and the flavors and aromas that are produced at this time are extracted and added to roasted coffee beans. The extracted flavors have a strong coffee aroma and are without the flavors and aromas peculiar to fermentation, and thus good coffee flavor and aroma can be added to the roasted coffee beans that are infused with these aroma and flavor components, and this allows the flavor and aroma of the coffee beans to be improved.

Patent Document 1: JP H1-112950A (see pg. 1)

DISCLOSURE OF INVENTION

Problem to be Solved by the Invention

The method disclosed by Patent Document 1 requires a process for adding to another coffee product, such as coffee beans, the flavor and aroma components that are extracted, and thus more coffee beans are consumed and this leads to higher costs, and it is time-consuming to improve the flavor and aroma of the coffee beans.

Additionally, it is difficult to separate the *Aspergillus oryzae* from the ground coffee beans because it is ground coffee beans that are inoculated with *A. oryzae*. Moreover, since this is done after the flavor and aroma components have been extracted from the ground coffee beans, the coffee beverages that are produced from these likely have decreased flavor and aroma and those ground coffee beans cannot be used to produce a coffee beverage extract.

It therefore is an object of the invention to provide a method of processing green coffee beans in which the flavor and aroma of the green coffee beans is easily improved so that richly fragrant coffee beans having unique aromas can be obtained with ease.

Means for Solving Problem (Configuration 1)

A first characteristic configuration of the method of processing green coffee beans according to the invention for achieving the above goals is featured by having a fermentation process of causing fermentation by bringing green coffee beans, which are unground seeds from coffee berries, microorganisms, and nutritive substances that are metabolized by the microorganisms, into contact with one another.

Embodiment 2, which is described later, details the results of an experiment performed to assess the effect on the aroma and flavor of the green coffee beans after performing a fermentation process of fermenting by bringing green coffee beans, microorganisms, and nutritive substances into contact with one another. The experiment was conducted by causing dried coffee berries to absorb a microorganism (yeast) suspension. Here the coffee berries have a green coffee bean and coffee pulp that serves as nutritive substance, and thus the coffee pulp is metabolized by the microorganisms.

Then, after the fermentation process, sensory analysis and component analysis were performed to assess the effect of microorganism fermentation on the flavor and aroma of the green coffee beans.

The results of the sensory analysis showed that the green coffee beans after the fermentation process had received a high rating score for brewing aroma, indicating that the green coffee beans had been infused with unique aromas, and no foreign smells were confirmed (Table 2).

The results of the component analysis showed that the green coffee beans after fermentation exhibited an increase in quantity of esters, alcohols, and total flavor and aroma components (Table 3).

In other words, the aroma and flavor components that were produced as the result of metabolic activity by the microorganisms (brewers yeast, for example) during fermentation had been transferred to the green coffee beans. This can be explained by the following.

Coffee seeds generally have the property of absorbing water in preparation for germination.

On the other hand, microorganisms such as yeast have the ability to metabolize carbon sources and nitrogen sources when these are present, and are known to create alcohols and esters through the metabolism of sugars and amino acids.

Carrying out fermentation by bringing green coffee beans (coffee seeds), nutritive substances, and microorganisms into contact with one another likely results in the green coffee beans absorbing, along with water, the alcohols and the esters that are generated by microorganism metabolism.

Alcohols and esters act as flavor and aroma components, and thus the transfer of these to green coffee beans likely adds those flavor and aroma components to the green coffee beans.

That is, carrying out the fermentation process by bringing green coffee beans, nutritive substances, and microorganisms into contact with one another was found to allow favorable aromas and flavors to be added through fermentation by the microorganisms.

(Configuration 2)

A second characteristic configuration of the method of processing green coffee beans according to the invention is the feature of performing a fermentation process of causing fermentation by bringing green coffee beans, which are unground seeds from coffee berries, microorganisms, and nutritive substances that are metabolized by the microorganisms into contact with one another, and then performing a separation process of separating out only the green coffee beans that have passed through the fermentation process.

(Configuration 3)

A third characteristic configuration of the method of processing green coffee beans according to the invention is the feature of having a fermentation process of bringing green coffee beans, which are unground seeds from coffee berries, and nutritive substances that are metabolized by microorganisms into contact with one another, and then bringing these into contact with microorganisms.

(Configuration 4)

A fourth characteristic configuration of the method of processing green coffee beans according to the invention is the feature of having a fermentation process of bringing microorganisms and nutritive substances that are metabolized by the microorganisms into contact with one another, and then brining these into contact with green coffee beans, which are unground seeds from coffee berries.

(Configuration 5)

A fifth characteristic configuration of the method of processing green coffee beans according to the invention is the feature of having a fermentation process of bringing green coffee beans, which are unground seeds from coffee berries, microorganisms, and nutritive substances that are metabolized by the microorganisms into contact with one another and causing fermentation, wherein the microorganisms are at least one type of microorganism selected from the group consisting of yeast, lactic acid bacteria, and mold.

(Configuration 6)

A sixth characteristic configuration of the method of processing green coffee beans according to the invention is the feature of having a fermentation process of bringing green coffee beans, which are unground seeds from coffee berries, microorganisms, and nutritive substances that are metabolized by the microorganisms, into contact with one another and causing fermentation, wherein the nutritive substances are at least one type of nutritive substance selected from the group consisting of fruit pulp, fruit juice, sugars, grains, and nutrient media.

(Configuration 7)

A seventh characteristic configuration of the method of processing green coffee beans according to the invention is the sixth characteristic configuration in which the fruit pulp is coffee pulp, and the coffee pulp has been dried.

(Configuration 8)

An eighth characteristic configuration of the method of processing green coffee beans according to the invention is the feature of causing fermentation by bringing coffee berries having a green coffee bean and coffee pulp, and microorganisms that metabolize the coffee pulp, into contact with one another.

(Configuration 9)

A ninth characteristic configuration of the method of processing green coffee beans according to the invention is the eighth characteristic configuration, in which the coffee berries have been dried.

(Configuration 10)

A tenth characteristic configuration of the method of processing green coffee beans according to the invention is the fifth characteristic configuration, in which the yeast is brewers yeast.

(Configuration 11)

An eleventh characteristic configuration of the invention is roasted coffee beans that are obtained by roasting green coffee beans that have been processed by method of processing green coffee beans that includes a fermentation process of bringing green coffee beans, which are unground seeds from coffee berries, microorganisms, and nutritive substances that are metabolized by the microorganisms, into contact with one another for fermentation.

In Embodiment 3, which is described later, green coffee beans that have been produced by the method of processing green coffee beans according to the invention are roasted, and sensory analysis and component analysis of the roasted coffee beans that are obtained are conducted.

The sensory analysis results show that the roasted coffee beans received a high rating for brewing aroma, which demonstrates that they have retained good aroma, and in particular have retained a sufficiently large amount of high volatility components, and no foreign smells were confirmed (Table 4).

The results of the component analysis show that there was an increase in esters, alcohols, and the overall amount of aroma and flavor components in the roasted coffee beans (Table 5).

In other words, it was found that the aroma and flavor components that are infused in the green coffee beans produced by the method of processing green coffee beans according to the invention were not lost in the course of the roasting process.

(Configuration 12)

A twelfth characteristic configuration of the invention is coffee beverages that are obtained by grinding up and adding water to the roasted coffee beans of the above eleventh characteristic configuration, then extracting the water through filtration with a filter.

In Embodiment 3, which is described later, green coffee beans that were prepared by the method of processing green coffee beans according to the invention were roasted, and the roasted coffee beans that were obtained were ground up and infused with water that was then extracted by filtering with a filter to produce a coffee beverage (drip extract, canned black coffee), and this was subjected to a sensory analysis and a component analysis.

The results of the sensory analysis showed that these coffee beverages received a high rating for brewing aroma and body feel, demonstrating that they have good aroma, and no foreign smells were confirmed (Tables 6 and 8).

The results of the component analysis showed that the coffee beverage (drip extract) exhibited an increase in esters, alcohols, and the overall amount of aroma and flavor components (Table 7).

In other words, it was found that the aroma and flavor components that were added to the green coffee beans produced by the method of processing green coffee beans according to the invention were not lost in the course of processing them into coffee beverages.

Effects of the Invention

With the method of processing green coffee beans according to the first characteristic configuration of the invention, to add good aroma and flavor components it is not necessary to perform tasks such as adding extracted aroma and flavor components to other green coffee beans, for example, and thus the flavor and aroma of the green coffee beans can be improved with ease. In other words, it is possible to directly infuse the green coffee beans with desirable aromas and flavors through the fermentation process. Put differently, it is possible to provide a method of processing coffee beans that allows richly fragrant coffee beans having unique aromas to be obtained with ease.

With the method of processing green coffee beans according to the second characteristic configuration of the invention, the green coffee beans that are used in the fermentation process have not been ground up and thus can easily be separated from the microorganisms. This allows only the green coffee beans that have been through the fermentation process to be easily selected out in the separation process, and therefore it is possible to obtain green coffee beans that have been infused with desirable aromas and flavors that can be supplied as they are as green coffee beans whose aroma and flavor have been improved.

The green coffee beans that are selected out in the separation process can be transported in the form of unground coffee beans, and thus can be adopted in a wide range of products and easily retain their aroma and flavor over an extended period of time.

With the method of processing green coffee beans according to the third characteristic configuration of the invention, the fermentation process can be started the moment that contact occurs with the microorganisms, and thus it becomes easy to start the fermentation process at a desired time.

Additionally, before starting the fermentation process by initiating contact with the microorganisms, it is possible to add additives such as pH adjusting agents, or to store, hold, or transport the green coffee beans and the nutritive substances with the two in contact with one another.

Thus, this method of processing green coffee beans is well suited for instances where it is necessary to perform various types of processing before starting the fermentation process.

With the method of processing green coffee beans according to the fourth characteristic configuration of the invention, it is for example possible to have the microorganisms and appropriate nutritive substances come into contact with one another in a fermentation tank, etc. in advance, and then perform the fermentation process by bringing green coffee beans into contact with these.

Thus, this method of processing green coffee beans is well suited for performing fermentation in a cycle such as bringing the nutritive substances and microorganisms into contact with one another in advance, then bringing these into contact with green coffee beans at a desired timing, stopping contact with the green coffee beans after a predetermined amount of time has elapsed, and then bringing new, other green coffee beans into contact with the nutritive substances and microorganisms.

Further, since the nutritive substances and the microorganisms can be brought into contact with one another in advance, agitating these and then bringing them into contact with green coffee beans results in a good state of contact between the green coffee beans, the nutritive substances, and the microorganisms. This processing method therefore is ideal for a situation in which it is desirable for the green coffee beans to be in uniform contact with the nutritive substances and the microorganisms.

With the method of processing green coffee beans according to the fifth characteristic configuration of the invention, it is generally easy to acquire and handle yeast, lactic acid bacteria, and mold, and thus the fermentation process can be conducted with ease. Further, conducting the fermentation process using these three types of microorganisms will likely result in the addition of different flavor and aroma components through fermentation by these microorganisms, and thus widens the range of aromas and flavors that can be added to the green coffee beans.

With the method of processing green coffee beans according to the sixth characteristic configuration of the invention, the nutritive substances can be at least one selected from the group consisting of fruit pulp, fruit juice, sugars, grains, and nutrient media, and thus it is possible to suitably select desired aroma and flavor components to be added to the green coffee beans from this group, which broadens the range of flavors and aromas that can be added.

That is to say, with this method of processing green coffee beans, it is possible to provide a method of processing green coffee beans that allows many types of aromas and flavors to be added.

With the method of processing green coffee beans according to the seventh characteristic configuration of the invention, it is possible to favorably use coffee pulp, which is a byproduct produced in the refinement process for obtaining green coffee beans from coffee berries. This allows the coffee pulp that is produced in the refinement process to be put to good use and it does not need to be discarded, and allows nutritive substances to be delivered quickly.

Further, since the coffee pulp has been dried, it is possible to use coffee pulp that can be transported with ease and has excellent shelf life, and this allows for suitable selection of the place and time to perform the fermentation process.

With the method of processing green coffee beans according to the eighth characteristic configuration of the invention, it is possible to proceed with the fermentation process by bringing coffee berries having coffee pulp, which serves as nutritive substance, into contact with the microorganisms, and thus not only it is possible to perform the fermentation process onsite where the coffee berries are picked but it also obviates the need to separately supply nutritive substances, and thus the processing can be performed quickly.

With the method of processing green coffee beans according to the ninth characteristic configuration of the invention, the coffee berries have been dried, which makes it possible to use coffee berries that can be transported with ease and that have excellent shelf life, and this allows the place and time to perform the fermentation process to be suitably selected.

With the method of processing green coffee beans according to the tenth characteristic configuration of the invention, brewers yeast such as wine fermentation yeast and beer fermentation yeast, which have a long history of use in food products, is used, and adding aromas and flavors can be carried out through fermentation using microorganisms that are highly safe.

With the roasted green coffee beans according to the eleventh characteristic configuration of the invention, the green coffee beans that have been obtained through the processing method set forth in the first characteristic configuration can be used to provide roasted coffee beans that have good added flavor and aroma.

With the coffee beverage according to the twelfth characteristic configuration of the invention, the roasted coffee beans according to the eleventh characteristic configuration can be used to produce coffee beverages that have good added flavor and aroma.

BEST MODE FOR CARRYING OUT THE INVENTION

Embodiments of the invention are described below in accordance with the drawings.

The method of processing green coffee beans of the invention shown in FIG. 1 is characterized in that it includes a fermentation process in which green coffee beans, which are the unground seeds of coffee berries, microorganisms, and nutritive substances that are metabolized by the microorganism, are brought into contact with one another to cause fermentation, and preferably it also includes a separation process of separating out only the green coffee beans that have undergone this fermentation process.

The method of processing green coffee beans according to the invention is described in detail below.

(Coffee)

In this invention, the term "coffee berries" indicates the berries of *Coffea* plants, and in broad terms include a seed (coffee seed) and pulp. Coffee types that can be used include *Coffea arabica*, *Coffea robusta*, and *Coffea liberica*, and these can have been grown in Brazil or Ethiopia, for example, although there is no particular limitation to these. One or two coffee seeds can be taken from a single coffee berry. Coffee seed is obtained by removing the coffee pulp and skin from the coffee berry. The term "green coffee beans" indicates the coffee beans that have been refined but have not yet been roasted.

There are two types of refinement methods for producing green coffee beans from coffee berries: a "dry" method and a "wet" method.

The dry method is a method for obtaining green coffee beans that involves drying harvested green coffee berries as they are, and after drying, the coffee berries are husked to remove their pulp and skin, for example.

On the other hand, in the wet method, harvested coffee beans are soaked in a tub to remove impurities and the coffee pulp is removed by a pulp removing machine, after which the beans are submerged in water in a fermentation tub to dissolve viscous substances on the seed, and after washing, they are dried and husked to remove the skin, etc. to yield green coffee beans.

The dry preparation process is easy to conduct, but it is mainly suited for areas with dry climates. On the other hand, wet preparation is primarily suited for areas that are characterized by abundant rainfall.

It should be noted that undried and dried coffee berries are used in this embodiment, and taking the specific gravity of a green coffee bean as 1, these have specific gravities of "coffee berry (undried):dried coffee berry:green coffee bean=6:4:1."

It is preferable that unground green coffee beans are used in this invention because they can be transported as coffee beans and the loss of flavor and aroma during roasting is prevented.

(Microorganisms)

There are no particular limitations regarding the microorganisms that are used in the invention, as long as they are capable of metabolizing the nutritive substances.

Specific examples of microorganisms include yeast, lactic acid bacteria, and mold.

These three types of microorganisms are obtained and handled with ease and thus can be used favorably.

Because of its safety as a food product, one example of yeast that can be used favorably is brewers yeast, such as wine fermentation yeast and beer fermentation yeast, which has a long history of use in food products.

One example of yeast for wine fermentation is the commercially-available dry yeast Lalvin L2323 strain (abbreviated hereinafter as L2323; Sceti Co., Ltd.) or CK S102 strain (abbreviated hereinafter as S102; BioSpringer). Ordinarily, L2323 is used to brew red wine and S102 is used to brew rose wine. Using yeast in this way allows characteristic aromas such as brewing aroma to be added.

Any lactic acid bacteria that is known to the public and used to manufacture fermented milk, lactic acid bacteria beverages, or cheese fermented milk, for example, can be used. As one illustrative example, lactic acid bacteria of the *Lactobacillus* genus can be used.

As for mold, one example of a mold that can be used is *Aspergillus*, which is used to produce fermented food products such as Japanese sake, the distilled liquor known as shochu, miso bean curd, and soy sauce.

According to the invention, various flavors and aromas can be added by selecting different microorganism types and growth conditions. Thus, microorganisms that allow desired flavors and aromas to be added are suitably selected and used. Selection of the microorganism is particularly important when coffee pulp is used as a nutritive substance or when coffee berries that have a green coffee bean and coffee pulp that serves as a nutritive substance are used, because selection of the nutritive substance is limited.

If the microorganisms have been dried, then they can be wetted by a method that is suitable for that microbe. For example, if dry yeast is used, then the before using the dry yeast it can be suspended for 20 to 30 minutes in water that has been heated to 37 to 41° C.

There are no particular limitations regarding the amount of microorganism used in this invention, as long as the effect of adding flavor and aroma can be obtained, and the amount of organism can be suitably set in view of the culture time and the cost. For example, per weight of green coffee bean, a concentration of $1.0 \times 10^8$ cells/g to $1.0 \times 10^{10}$ cells/g is appropriate if using yeast or lactic acid bacteria, and 0.01 to 0.1 wt % by spore is appropriate if using mold.

(Nutritive Substance)

There are no particular limitations regarding the nutritive substances referred to in the invention, as long as they can be metabolized by the above microorganism. Possible examples include fruit pulp, fruit juice, sugars, grains, and nutrient media. At least one type of nutritive substance is selected from this group of nutritive substances. It is possible to add various flavors and aromas by suitably selecting the nutritive substance.

Of these nutritive substances, the use of fruit pulp is favorable because of the ease with which it may be obtained.

Here, fruit pulp is used to refer to the part surrounding the seed of the fruit that includes sugars and other nutrients. Examples of fruit pulp that may be used include coffee pulp, grape pulp, cherry pulp, and peach pulp.

Of these, coffee pulp can be used favorably because it is a byproduct of the refining process for obtaining green coffee beans from coffee berries. Thus, the coffee pulp that is obtained in the refining process does not have to be discarded and can be put to good use.

The above fruit pulp can be raw fruit pulp or dried fruit pulp to which moisture has been added. From the standpoint of transport and storage, the use of dried coffee berries is preferable.

Examples of fruit juice that can be used include grape juice, peach juice, and apple juice.

Examples of sugars include monosaccharides, disaccharides, and polysaccharides taken from plants such as sugar cane and sweet potatoes.

Examples of grains include wort made of malted barley.

Examples of nutrient media include those used for normal microorganism culturing, and for example, if yeast is being used, then it is possible to use WL Nutrient Broth (product of Difco).

If the nutritive substances that are used have a low water content, then it is desirable that water is suitably added to them in the fermentation process.

There are no particular limitations regarding the ratio of the mixture of green coffee beans and nutritive substances, as long as the nutritive substances can be metabolized by the microorganisms. This ratio can be suitably set based on the degree of flavor and aroma that is to be added to the green coffee beans.

Since coffee pulp can be favorably used as nutritive substance as described above, coffee berries that include green coffee beans and coffee pulp serving as nutritive substance can be used favorably. In this case, the green coffee beans can be processed by bringing the coffee berries and the microorganisms into contact with one another. Doing this obviates the need to provide nutritive substances separately, and thus allows processing to be carried out rapidly.

Although it is possible for the coffee berries to be undried berries, from the standpoint of transport and storage it is preferable that dried coffee berries are used.

In this case, the coffee berries are first furnished with water or soaked in a water tub for used in the fermentation process.

During the fermentation process, various types of additives can be added as needed in addition to the green coffee beans and the nutritive substances. For example, it is possible to add, in a supplementary manner, pH regulators such as citric acid or malic acid, or conventionally available nutrient media for augmenting the nitrogen source or the carbon source.

(Contact Conditions in the Fermentation Process)

The following methods are examples of methods for bringing the green coffee beans, nutritive substances, and microorganisms into contact with one another in the invention:

(1) a method in which the green coffee beans and nutritive substances are brought into contact with one another and then the microorganisms are sprayed or dispersed to contact these;

(2) a method in which the green coffee beans and the nutritive substances are soaked in a suspension that includes the microorganisms;

(3) a method in which microorganisms are suspended in water that will be absorbed by the dried nutritive substances (in order words, the nutritive substances and the microorganisms are brought into contact with one another), and then these are brought into contact with the green coffee beans; and (4) a method in which microorganisms are suspended in the water that will be absorbed by dried coffee berries.

(Fermentation Conditions)

There are no particular limitations regarding the fermentation conditions of the microorganisms, as long as fermentation is carried out. The fermentation conditions of the microorganisms can be suitably set for the microorganisms and nutritive substances that are adopted.

For example, if coffee berries that include green coffee beans and coffee pulp serving as nutritive substance are used, then the microorganism fermentation process can be performed during the process of refining the green coffee beans.

For example, in a dry refining process, microorganisms can be brought into contact with and allowed to ferment coffee berries that have been harvested but not yet dried, and then those berries can be dried.

On the other hand, in a wet refining process, microorganisms can be brought into contact with harvested coffee berries such as before the berries are submerged in a water tub, when they are submerged in the water tub to remove impurities, or after they have been taken out of the water tub but before the coffee pulp is removed.

It is also possible to ferment the coffee berries still on the tree before they are harvested.

In these cases it is possible to prevent contamination by other microorganisms or control conditions such as the temperature and pH, and for example, the fermentation process can be performed by selecting microorganisms that are capable of fermentation in a low-temperature environment between 15 and 30° C. or performed using the compositions of acidic conditions that are created by adding citric acid, for example, to inhibit fermentation by various other bacteria.

If fruit pulp, fruit juice, or a nutrient medium, for example, is used as the nutritive substance, then the fermentation process can be performed in an incubator, tank, or storage house that prohibits infiltration by other bacteria and allows growth conditions such as the temperature and the concentration of carbon dioxide to be controlled.

There are no limitations regarding the time required for the fermentation process, and this can be suitably chosen based on the quality and strength of the flavor and aroma to be added or based on the microorganism or nutritive substance. It is also possible to end the fermentation process once the nutritive substances have been consumed.

To end the fermentation process, it is possible to add heat to kill the microorganisms, wash the green coffee beans or dry them in the sun, separate the green coffee beans from the nutritive substance, or combine fermentation with a method such as roasting. For example, fermentation can be ended by using a drying machine to dry the product at 50 to 60° C. for about one day.

As described above, bringing the green coffee beans, the nutritive substances, and the microorganisms into contact with one another to execute the fermentation process allows the flavor and aroma components that are generated by the metabolic activity of the microorganisms (for example, brewers yeast) to be transferred to the green coffee beans during fermentation to add richly fragrant aroma and flavor components that have unique aromas to the green coffee beans.

The green coffee beans infused with flavors and aromas having rich aromas according to the invention then pass through a separation process to separate out only those green coffee beans that have been fermented, and by doing so they are separated from the nutritive substances and the microorganisms.

Any method may be used for the separation process as long as that method involves segregating only the green coffee beans that have been infused with flavor and aroma components from the mixture of green coffee beans, nutritive substances, and microorganisms (for example, washing with water). The green coffee beans that are used in the fermentation process have not been ground up and therefore can be readily separated from the microorganisms.

The green coffee beans thus separated may be roasted by a normal roasting method to produce roasted coffee beans.

The roasted coffee beans that are obtained can be ground up and infused with water, which is then extracted through a filter by filtration, and this can be taken as a regular coffee beverage or it can be used as an industrial ingredient for instant coffee, coffee extract, or canned coffee, etc.

The roasted coffee beans and coffee beverages that are obtained at this time have been confirmed to have sufficiently good flavor and aroma, as illustrated in Embodiment 3, which is described later, even when the green coffee beans that have been infused with good coffee flavor and aroma have been turned into roasted coffee beans or coffee beverages.

Thus, this invention not only allows green coffee beans that have been infused with excellent flavor and aroma to be obtained, but also can be used in tandem with conventionally known techniques for altering the flavor and aroma of coffee beans.

The invention is described in specific detail in the following embodiments, however, the invention is not limited to these embodiments.

Embodiment 1

Using coffee berries and yeast, the form of the coffee berries and the yeast type were changed to assess the suitability of various conditions for fermentation.

Two types of coffee berries were examined, these being (1) undried coffee berries (Okinawa-grown Arabica berries washed in water), and (2) dried coffee berries that have been soaked in water (dried Brazil-grown Arabica coffee beans soaked in purified water for 40 minutes).

Two types of dried yeast (the L2323 and S102 described above) were used.

3 g of each dried yeast was suspended in 50 mL water heated to 41° C. and let stand for approximately 30 minutes, yielding a concentrated yeast-containing solution having a yeast concentration of $6.0 \times 10^9$ cells per 1 mL. This was then diluted by a factor of 20 to produce a yeast suspension ($3.0 \times 10^8$ cells/ml).

100 g of each of the above coffee berries was placed in a triangular flask, and to this was added 250 mL of the yeast suspension, and the flask was capped by a silicon cap and incubated for seven days at 22° C. The drop in weight of the flask was measured. A control in which water was used in lieu of the yeast suspension also was prepared.

The results are shown in FIG. 2 and FIG. 3.

No drop in weight was confirmed in the control for the (1) undried coffee berries (FIG. 2) and the (2) dried coffee berries submerged in water (FIG. 3), but when the two types of yeast were added, in both cases a drop in weight was confirmed.

Here, a silicon lid that is permeable to air but is not permeable to water is used. The carbon dioxide produced by the metabolism of components in the coffee berries by the yeast can escape to the outside through the silicon cap, and the weight of the flask drops by the amount of carbon dioxide that escapes. This drop in weight can be used as an indicator of growth by the yeast in contact with the coffee berries.

The drop in sample quantity plateaued after seven days, and from this it was concluded that the coffee berries would not be metabolized further.

Thus, regardless of whether the coffee berries were dried or undried, it was confirmed that the yeast can metabolize and grow from coffee pulp as a nutritive substance.

Embodiment 2

Using dried coffee berries, the effect that microorganism fermentation has on the flavor and aroma of green coffee beans was examined.

Arabica beans grown in Brazil were used as the dried coffee berries. As the yeast suspension, the two types of yeast suspensions (L2323 and S102) described in Embodiment 1 were used.

500 mL yeast suspension was added to and absorbed by 200 g dried coffee berries. This was then placed in a triangular flask, and the flask was capped by a silicon cap and incubated for six days at 22° C.

The weight of the flask was measured after day six, and in both causes a drop in weight was confirmed (see Table 1). It was therefore concluded that fermentation by the microorganisms had occurred in each sample.

TABLE 1

| yeast | weight drop (g) |
|-------|-----------------|
| L2323 | 1.69 |
| S102  | 2.09 |

<Evaluating the Coffee Beans>

The coffee berries in the flask after six days incubation were dried at 55° C. for 24 hours in a drying machine, and then their pulp and skin were removed, producing 70 to 90 g of green coffee beans. As a control, the dried coffee berries were further dried by leaving them at 55° C. for approximately one day and then their pulp and skin were removed. The green coffee beans that were obtained were subjected to a sensory analysis and a flavor and aroma component analysis.

The green coffee beans after fermentation by L2323 will be called the L2323 green beans, those for S102 will be called the S102 green beans, and those for the control will be called the control green beans.

1. Sensory Analysis

Sensory analysis was performed by a panel of five coffee sensory assessors. 30 g of each green coffee bean was placed in a dedicated sensory flask as is without being ground, and this was capped. To perform sensory analysis, the assessors displaced the cap and evaluated the five fields of brewing aroma, top note, last note, grassiness, and the presence of foreign smells. These fields were evaluated using a five point rating system, in which the brewing aroma of the control green beans was assigned a 1 and the other fields of the control green beans were assigned a 3, and values larger than this indicated stronger (better) and values smaller than this indicated weaker (poorer). The mean values of the values assigned by the assessors were found. The mean values are shown in Table 2.

It should be noted that "brewing aroma" refers to the fruity fermentation aroma, "top note" refers to the first impression of the aroma, "last note" refers to the lingering aroma, "grassiness" refers to the grassy smell, and "foreign smells" are smells normally not found in coffee beans.

TABLE 2

| evaluated field | control green beans | L2323 green beans | S102 green beans |
|---|---|---|---|
| brewing aroma | 1 | 5 | 5 |
| top note | 3 | 4.6 | 4.4 |
| last note | 3 | 3.2 | 3 |
| grassiness | 3 | 2.8 | 2.8 |
| foreign smells | absent | absent | absent |

The L2323 beans and the S102 beans both received a high brewing aroma rating, indicating that they had been infused with good aroma. On the other hand, foreign smells were not confirmed.

2. Component Analysis

Gas chromatography (GC) was used to analyze the flavor and aroma components. 10 g of each unground green coffee beans were placed in GC sample tubes, and the headspace gas was analyzed. The devices used were the "Agilent 7694 HeadspaceSampler" (made by Agilent Technologies) and the "Agilent 6890 GC System" (made by Agilent Technologies).

The samples were introduced at 60° C. over 30 minutes at a 5:1 split, and a HP-INNOWax (60 m×0.25 mm inner diameter, 0.25 µm film thickness) column was used. The temperature was held at 40° C. for four minutes and then increased 3° C./min up to 220° C., then held at 230° C. for 30 minutes. MSD and FID detectors were used.

This analysis focused on esters and alcohols as flavor and aroma components, and their peak areas were measured.

Here, the esters was found by taking the sum of the total peak areas of methyl acetate (retention time: 3.9), ethyl acetate (retention time: 6.3), and isobutyl ethyl ether (retention time: 15.7), which have characteristic smells.

The alcohols was found by taking the sum of the total peak areas of ethanol (retention time: 8.5) and isoamyl alcohol (retention time: 25.0).

The total amount of flavor and aroma components was found by taking the sum of the peak areas of the esters and alcohols in addition to the peak areas of acetaldehyde, isobutyl aldehyde, and furfuryl alcohol.

The results are shown in Table 3.

TABLE 3

| peak area (pA × s) | control green beans | L2323 green beans | S102 green beans |
|---|---|---|---|
| esters | 87 | 522 | 381 |
| alcohols | 953 | 58431 | 20445 |
| total aroma and flavor component | 1106 | 59156 | 20930 |

Compared to the control green beans, the L2323 green beans and the S102 green beans both showed an increase in peak area for esters, alcohols, and the total flavor and aroma component, and the L2323 green beans exhibited a particularly noticeable increase in alcohol peak area.

The results of the sensory analysis and the component analysis of the green coffee beans indicate that the flavor and aroma components generated by the metabolic activities of the brewers yeast had been transferred to the green coffee beans. It was also understood that no foreign smells were found. The results can be explained as follows.

Coffee seeds generally have the property of absorbing water in preparation for germination.

On the other hand, microorganisms such as yeast have the ability to metabolize carbon sources and nitrogen sources when these are present, and are known to create alcohols and esters through the metabolism of sugars and amino acids.

Carrying out fermentation by bringing green coffee beans (coffee seeds), nutritive substances, and microorganisms into contact with one another likely results in the green coffee beans absorbing, along with water, the alcohols and the esters that are generated by microorganism metabolism. Alcohols and esters function as flavor and aroma components, and thus the transfer of these to the green coffee beans likely infuses the green coffee beans with those flavor and aroma components.

That is to say, conducting the fermentation process with yeast, which is a microorganism, allows unique flavors and aromas such as brewing aromas to be added, and for this it was affirmed that processing green coffee beans using the method of the invention has benefit.

Embodiment 3

An evaluation was performed on the roasted coffee beans obtained using green coffee beans that were processed by the method of processing green coffee beans according to the invention, and coffee beverages were obtained by grinding those roasted coffee beans, infusing them with water and then extracting the water through filtration using a filter. Evaluation of the coffee beverages was performed by preparing drip extract and canned coffee.

A. Evaluating the Roasted Coffee Beans

Roasted coffee beans were prepared using the three types of green coffee beans that were obtained in Embodiment 2 (L2323 green beans, S102 green beans, control green beans).

70 to 90 g of each green coffee bean was roasted for approximately 30 minutes at a temperature between 150 to 200° C. using a roasting machine (made by PROBAT; Battery Sample Roaster BRZ2), yielding approximately 40 to 50 g of roasted coffee beans with an L value (indicator of roasting) of about 20 (these will be referred to as the L2323 roasted beans, the S102 roasted beans, and the control roasted beans).

Without grinding them, the roasted beans that were obtained were subjected to a sensory analysis and composition analysis by gas chromatography (GC).

A1. Sensory Analysis of the Roasted Coffee Beans

This analysis was conducted in the same manner as in Embodiment 2, except that the five fields that were evaluated were brewing aroma, top note, last note, roasted aroma, and the presence of foreign smells. The results are shown in Table 4.

It should be noted that "roasted aroma" indicates the degree of fragrant aroma.

TABLE 4

| evaluated field | control roasted beans | L2323 roasted beans | S102 roasted beans |
|---|---|---|---|
| brewing aroma | 1 | 4.8 | 4.8 |
| top note | 3 | 4.4 | 4.4 |
| last note | 3 | 3.4 | 3.2 |
| roasted aroma | 3 | 3 | 3 |
| foreign smells | absent | absent | absent |

The results show that both the L2323 roasted beans and the S102 roasted beans received a high brewing aroma assessment and retained good aroma. The higher rating for the top note than the last note is an indication that, in particular, a sufficiently large amount of components with high volatility was remaining. No foreign smells were confirmed.

A2. Analysis of Roasted Coffee Bean Components

The flavor and aroma components of each type of roasted coffee bean were analyzed using gas chromatography (GC). Analysis was performed after placing 5 g of the roasted coffee beans in a GC sample tube. The analysis was conducted in the same manner as in Embodiment 2. The results are shown in Table 5.

TABLE 5

| peak area (pA × s) | control roasted beans | L2323 roasted beans | S102 roasted beans |
|---|---|---|---|
| esters | 423 | 1805 | 1124 |
| alcohols | 79 | 4050 | 2454 |
| total aroma and flavor component | 3163 | 14405 | 11354 |

Compared to the control roasted beans, the L2323 roasted beans and the S102 roasted beans both showed an increase in peak area for esters, alcohols, and the total flavor and aroma component. This indicates that the flavors and aromas that were added by the above method of processing green coffee beans according to the invention were not lost in the roasting process.

B. Evaluating the Coffee Beverage (Drip Extract)

A coffee extract was prepared from each of the three types of roasted coffee beans (L2323 roasted beans, S102 roasted beans, and control roasted beans). The coffee beans were finely ground and 270 g of hot water was added to 30 g of the grinds, and then drip extraction was conducted to obtain approximately 200 g of extract. The three types of extract that were obtained will be called the L2323 extract, the S102 extract, and the control extract. A sensory analysis and a component analysis were conducted for each extract.

B1. Sensory Analysis of the Drip Extract

Sensory analysis was conducted by a panel of five coffee sensory assessors. The assessors evaluated the six fields of brewing aroma, bitterness, acidity, finish, body feel, and the presence of foreign smells. These fields were evaluated using a five point rating system, in which the brewing aroma of the control green beans was assigned a 1 and the other fields of the control green beans were assigned a 3, and values larger than these indicate stronger (better) and smaller values indicate weaker (poorer). The mean values of the values assigned by the assessors were found. The mean values are shown in Table 6.

It should be noted that "body feel" indicates the body, mouthfeel, and the roundness of the aroma.

TABLE 6

| evaluated field | control extract | L2323 extract | S102 extract |
|---|---|---|---|
| brewing aroma | 1 | 5 | 4.8 |
| bitterness | 3 | 2.8 | 2.8 |
| acidity | 3 | 3 | 3.2 |
| finish | 3 | 3.2 | 3.2 |
| body feel | 3 | 4 | 3.8 |
| foreign smells | absent | absent | absent |

The L2323 extract and the S102 roasted beans both were given a high rating in brewing aroma and body feel and were found to have good aroma.

B2. Analysis of the Drip Extract Components 10 mL of each extract was put into a GC sample tube and GC analysis was conducted. This analysis was conducted in the same manner as in Embodiment 2. The results are shown in Table 7.

TABLE 7

| peak area (pA × s) | control extract | L2323 extract | S102 extract |
|---|---|---|---|
| esters | 124 | 1080 | 1010 |
| alcohols | 21 | 831 | 905 |
| total aroma and flavor component | 831 | 3138 | 2927 |

Compared to the control extract, the L2323 extract and the S102 extract both showed an increase in peak area for esters, alcohols, and the total flavor and aroma component. This indicates that the flavors and aromas that were added by the above method of processing green coffee beans according to the invention were not lost during processing into a coffee beverage (drip extract).

C. Evaluating the Coffee Beverage (Canned Black Coffee)

The above extracts were used to prepare canned fermented black coffee.

To prepare the coffee, approximately 200 g of the extract was filtered with filter paper and sodium bicarbonate was added to the filtered liquid to adjust the pH to approximately 5.7, after which water was used to adjust this to a Brix of approximately 1.00 and 190 g of this was canned and retort sterilization was performed (125° C., F value: 12).

The three types of canned coffee thus obtained will be referred to as L2323 canned coffee, S102 canned coffee, and control canned coffee.

These three types of canned black coffee were subjected to a sensory analysis.

C1. Sensory Analysis of the Canned Black Coffee

This evaluation was conducted using the same method as that adopted when evaluating the above drip extracts. The results are shown in Table 8.

TABLE 8

| evaluated field | control canned coffee | L2323 canned coffee | S102 canned coffee |
|---|---|---|---|
| brewing aroma | 1 | 5 | 5 |
| bitterness | 3 | 3 | 2.8 |
| acidity | 3 | 3.2 | 3 |
| finish | 3 | 3 | 3 |
| body feel | 3 | 3.4 | 3.2 |
| foreign smells | absent | absent | absent |

The L2323 canned coffee and the S102 canned coffee both exhibited a notable brewing aroma and were not found to include foreign smells. Both also had a stronger body feel than the control.

The results of analyzing the above roasted coffee beans and coffee beverages (drip extract and canned black coffee) show that the aroma and flavor components that were added to the green coffee beans using the method of processing green coffee beans according to the invention were not lost when the roasted coffee beans and the coffee beverages were produced.

Thus, it was confirmed that the method of processing green coffee beans of the invention allows roasted coffee beans and coffee beverages having rich aromas and flavors to be produced.

Embodiment 4

The dry refining process was performed as described above to produce green coffee beans from coffee berries. Testing was performed to determine whether or not it is possible to adopt the method of processing green coffee beans according to the invention in the course of this dry refining process.

To simulate harvested coffee berries, undried coffee berries were used and yeast was sprayed onto these.

The yeast strains used were L2323 and S102. 3 g of yeast were put into separate tubes and the tubes were filled with 50 mL water, capped and agitated. Each tube was then kept in a 41° C. water bath for 30 minutes to produce a yeast-containing solution having $6.0 \times 10^9$ cells per 1 mL.

Undried Okinawan Arabica coffee berries were used as is. 25 mL of the above yeast-containing solution was sprayed onto 300 g coffee berries. The sprayed coffee berries were then put in a triangular flask, capped with a silicon lid, and then incubated at 22° C. for two days. After two days, the weight of the flask was measured. The results are shown in Table 9.

TABLE 9

| yeast | weight drop (g) |
|---|---|
| L2323 | 5.82 |
| S102 | 5.89 |

The results show that there was a drop in weight in both samples. Thus, it can be concluded that fermentation by yeast had proceeded in these samples to which yeast had been added.

The dry refining process was continued to produce green coffee beans from the coffee berries. A sensory analysis was conducted on the green coffee beans that were obtained. This analysis was conducted in the same manner as in Embodiment 2. It should be noted that control green beans that were not fermented by yeast were taken as a control. The green coffee beans after fermentation by L2323 will be referred to as L2323 green beans, the green coffee beans after fermentation by S102 will be referred to as S102 green beans, and the green coffee beans of the control will be referred to as control green coffee beans. The results are shown in Table 10.

TABLE 10

| evaluated field | control green beans | L2323 green beans | S102 green beans |
|---|---|---|---|
| brewing aroma | 1 | 5 | 5 |
| top note | 3 | 4.6 | 4.8 |
| last note | 3 | 3.2 | 3.2 |
| grassiness | 3 | 3 | 3 |
| foreign smells | absent | absent | absent |

Both the L2323 green beans and the S102 green beans received high scores in brewing aroma, affirming that they had been infused with good aroma.

This shows that it is possible to adopt the present invention when performing a dry refinement process by spraying a yeast-containing solution onto undried coffee berries before they are depulped, at the site (production site) where the coffee beans are harvested.

Embodiment 5

A case in which fermentation was actually performed during the dry refinement process was examined.

300 Kg of harvested Brazilian Arabica coffee berries (undried) were spread out on a sheet.

50 L of water was then added to 3 kg of dry yeast (L2323), agitated and let stand for 40 minutes to yield a yeast-containing solution of $6.0 \times 10^9$ cells/mL. This was uniformly dispersed in buckets over the spread-out coffee berries and lightly agitated, after which the coffee berries were covered with a plastic sheet and left undisturbed for two days.

The coffee berries were subsequently dried and husked to remove their pulp and skin, for example, producing green coffee beans infused with good aroma and flavor. Those green coffee beans were roasted according to a standard roasting method to produce roasted coffee beans having good aroma and flavor.

Embodiment 6

A wet refining process was performed as described above to obtain green coffee beans from coffee berries. Testing was performed to determine whether or not it is possible to adopt the method of processing green coffee beans according to the invention during the course of this wet refining process.

To simulate harvested coffee berries, undried coffee berries were used and soaked in a yeast suspension.

The yeast strains used were L2323 and S102. 3 g of yeast were put into separate tubes and the tubes were filled with 50 mL water, capped and agitated. Each tube was then placed in 41° C. warm water for 30 minutes, then diluted by a dilution factor of 20× to produce a yeast suspension ($3.0 \times 10^8$ cells/ml).

Undried Okinawan Arabica coffee berries were used as is. 500 mL of the above yeast suspension and 300 g coffee berries were put into a triangular flask, this was capped with a silicon lid, and the flask was then incubated at 22° C. for two days. After two days, the weight of the flask was measured. The results are shown in Table 11.

TABLE 11

| yeast | weight drop (g) |
|---|---|
| L2323 | 6.20 |
| S102 | 6.48 |

The results show that there was a drop in weight in both samples. It can be therefore concluded that fermentation by yeast had proceeded in these samples infused with yeast.

The wet refining process was continued to produce green coffee beans from the coffee berries. A sensory analysis was conducted on the green coffee beans that were obtained. This analysis was performed in the same manner as in Embodiment 2. It should be noted that green coffee beans that were not fermented by yeast were taken as a control. The green coffee beans after fermentation by L2323 will be referred to as L2323 green beans, the green coffee beans after fermentation by S102 will be referred to as S102 green beans, and the green coffee beans of the control will be referred to as control green coffee beans. The results are shown in Table 12.

TABLE 12

| evaluated field | control green beans | L2323 green beans | S102 green beans |
|---|---|---|---|
| brewing aroma | 1 | 5 | 5 |
| top note | 3 | 4.6 | 4.4 |
| last note | 3 | 3.2 | 3.2 |

TABLE 12-continued

| evaluated field | control green beans | L2323 green beans | S102 green beans |
|---|---|---|---|
| grassiness | 3 | 3 | 3 |
| foreign smells | absent | absent | absent |

The L2323 green beans and the S102 green beans both received high scores in brewing aroma, confirming that they had been infused with good aroma.

Thus, this demonstrates that the present invention can be adopted onsite where coffee beans are harvested by adding yeast (microorganisms) to pre-depulped coffee berries in a water tub during the wet refining process.

Embodiments 4 and 6 demonstrate that the method of processing green coffee beans of the invention can be adopted in both dry and wet refinement processing methods. The method of processing green coffee beans therefore can be easily introduced during normal refinement processing and employed where the coffee beans are grown at the sites and where the dried green coffee beans are shipped, without being accompanied by large investments in equipment.

Embodiment 7

A case in which fermentation was actually performed during the wet refinement process was examined.

300 Kg of harvested Columbian Arabica coffee berries (undried) were washed and put into a 1 KL fermentation tank.

50 L of water was then added to 3 kg of dry yeast (L2323) and let stand for 40 minutes to yield a yeast containing-solution. This yeast containing-solution was diluted by a dilution factor of 20 to a concentration of $3.0 \times 10^8$ cells/mL. 500 L of the yeast suspension was loaded into the 1 KL tank and was suitably agitated over two days.

The coffee berries were subsequently washed with water and husked to remove their pulp and skin, for example, producing green coffee beans to which good aroma and flavor had been added. The green coffee beans were roasted by a standard roasting method to produce roasted coffee beans having good aroma and flavor.

Embodiment 8

Various types of nutritive substances were used to evaluate the effect that microorganism fermentation has on the flavor and aroma of green coffee beans.

For the dried green coffee beans, Brazilian Arabica beans were used. The yeast suspension (L2323) described in Embodiment 1 was used as the yeast suspension.

3 g of the dried yeast was suspended in 50 mL water heated to 41° C. and let stand for approximately 30 minutes, yielding a concentrated yeast-containing solution having a yeast concentration of $6.0 \times 10^9$ cells per 1 mL.

Three types of nutritive substances were examined: (1) apple juice, (2) grape juice, and (3) YM medium. The apple juice and the grape juice used were commercially available, fruit juice concentrate (50 BRIX) diluted by a dilution factor of 5. The YM medium used was a YM Broth made by Difco dissolved in water to achieve a per L concentration of Yeast Extract 3.0 g, Malt Extract 3.0 g, Peptone 5.0 g, and Dextrose 10.0 g.

To a triangular flask, first 240 mL of an above nutritive substance was added, then 10 mL of the yeast suspension and 50 g of the above green coffee beans were added, this was capped by a silicon cap, and incubated for seven days at 22° C. The drop in weight of the flask was measured. A control in which water was used in lieu of the yeast suspension also was prepared.

The results are shown in Table 13. No drop in weight was confirmed in the control for the (1) apple juice, the (2) grape juice, or the (3) YM medium, but when the either of the two types of yeast were added to these, a drop in weight was confirmed in all three cases.

Here, a silicon lid that is permeable to air but is not permeable to water is used. The carbon dioxide produced by the metabolism of components in the various nutritive substances by the yeast could escape to the outside through the silicon cap, and the weight of the flask dropped by the amount of carbon dioxide that escaped. This drop in weight can be taken as an indication that there was growth in the yeast in contact with the coffee berries.

The drop in sample quantity plateaued after seven days, and from this it was concluded that the coffee berries would not be metabolized further.

Thus, it was confirmed that the yeast could metabolize and grow regardless of nutritive substance type.

TABLE 13

| various nutritive substances | weight drop (g) |
|---|---|
| control | 0.00 |
| apple juice | 2.18 |
| grape juice | 2.26 |
| YM medium | 2.66 |

<Evaluating the Green Coffee Beans>

The four types of green coffee beans, inclusive of the control, were dried in their flask at 55° C. for 24 hours by a drying machine after incubating for seven days, producing approximately 50 g of green coffee beans. A sensory analysis was then performed on the green coffee beans that were obtained.

The green coffee beans after fermentation by apple juice nutritive substance will be called the apple juice green beans, those for the grape juice will be called the grape juice green beans, those for the YM medium will be called the YM medium green beans, and those for the control will be called the control green beans.

1. Sensory Analysis

Sensory analysis was performed by a panel of five coffee sensory assessors. 30 g of each green coffee bean was placed in a dedicated sensory flask as is without being ground, and this was capped. To perform sensory analysis, the assessors displaced the cap and evaluated the five fields of brewing aroma, top note, last note, grassiness, and the presence of foreign smells. These fields were evaluated using a five point rating system, in which the brewing aroma of the control green beans was assigned a 1 and the other fields of the control green beans were assigned a 3, and values larger than these indicated stronger (better) and smaller values indicated weaker (poorer). The mean values of the values assigned by the assessors were found. The mean values are shown in Table 14.

It should be noted that "brewing aroma" refers to the fruity fermentation aroma, "top note" refers to the first impression of the aroma, "last note" refers to the lingering aroma, "grassiness" refers to the grassy smell, and "foreign smells" are smells normally not found in coffee beans.

TABLE 14

| evaluated field | control green beans | apple juice green beans | grape juice green beans | YM medium green beans |
|---|---|---|---|---|
| brewing aroma | 1 | 5 | 5 | 5 |
| top note | 3 | 4.6 | 4.7 | 4.5 |
| last note | 3 | 3.1 | 3.2 | 3 |
| grassiness | 3 | 2.7 | 2.9 | 2.8 |
| foreign smells | absent | absent | absent | absent |

All of the various nutritive substance samples received a high brewing aroma score, indicating that a good aroma. On the other hand, foreign smells were not confirmed.

<Evaluating the Roasted Coffee Beans>

70 to 90 g of each of the four types of green beans, which is inclusive of the control, was roasted at a temperature between 150 to 200° C. for approximately 30 minutes using a roasting machine (made by PROBAT; Battery Sample Roaster BRZ2), yielding approximately 40 to 50 g of roasted coffee beans with an L value (indicator of degree of roasting) of about 20.

The roasted apple juice green beans will be referred to as the apple juice roasted beans, the roasted grape juice green beans will be referred to as the grape juice roasted beans, those for the YM medium will be referred to as the YM medium roasted, and those of the control will be referred to as the control roasted. A sensory analysis was performed on these various roasted coffee bean types.

1. Sensory Analysis

Sensory analysis was performed by a panel of five coffee sensory assessors. 30 g of each green coffee bean was placed in a dedicated sensory flask as is without first being ground, and this was capped. To perform sensory analysis, the panelists displaced the cap and evaluated the five fields of brewing aroma, top note, last note, roasted aroma, and the presence of foreign smells. These fields were evaluated using a five point rating system, in which the brewing aroma of the control green beans was assigned a 1 and the other fields of the control green beans were assigned a 3, and values larger than these indicated stronger (better) and smaller values indicated weaker (poorer). The mean values of the values assigned by the assessors were found. The mean values are shown in Table 15.

It should be noted that "brewing aroma" refers to the fruity fermentation aroma, "top note" refers to the first impression of the aroma, "last note" refers to the lingering aroma, "roasted aroma" refers to the fragrance, and "foreign smells" are smells normally not found in coffee beans.

TABLE 15

| evaluated field | control roasted beans | apple juice roasted beans | grape juice roasted beans | YM medium roasted beans |
|---|---|---|---|---|
| brewing aroma | 1 | 4.7 | 4.9 | 4.8 |
| top note | 3 | 4.5 | 4.6 | 4.5 |
| last note | 3 | 3.1 | 3.2 | 3.2 |
| roasted aroma | 3 | 3 | 3.1 | 3 |
| foreign smells | absent | absent | absent | absent |

All of the various roasted beans of this invention received a higher brewing aroma score than the control, and this indicates that they have excellent aroma. On the other hand, foreign smells were not confirmed.

B. Evaluating the Coffee Beverage (Drip Extract)

Coffee extracts were prepared from each of the four types of roasted coffee beans (apple juice roasted beans, grape juice roasted beans, YM medium roasted beans, and control roasted beans). The roasted beans were finely ground and 270 g of hot water was added to 30 g of the grinds to perform a drip extraction, producing approximately 200 g of roasted bean extract. The four types of extract that were obtained will be called the apple juice roasted bean extract, the grape juice roasted bean extract, the YM medium roasted bean extract, and the control roasted bean extract. Sensory analysis was conducted for each extract.

(Sensory Analysis of the Drip Extracts)

Sensory analysis was conducted by a panel of five coffee sensory assessors. These panelists evaluated the six fields of brewing aroma, bitterness, acidity, finish, body feel, and the presence of foreign smells. These fields were evaluated using a five point rating system, in which the brewing aroma of the control green beans was assigned a 1 and the other fields of the control green beans were assigned a 3, and values larger than these indicate stronger (better) and smaller values indicate weaker (poorer). The mean values of the values assigned by the panelists were found. The mean values are shown in Table 16.

It should be noted that "body feel" indicates the body, mouthfeel, and the roundness of the aroma.

TABLE 16

| evaluated field | control roasted bean extract | apple juice roasted bean extract | grape juice roasted bean extract | YM medium roasted bean extract |
|---|---|---|---|---|
| brewing aroma | 1 | 4.7 | 4.8 | 4.6 |
| bitterness | 3 | 2.9 | 3.1 | 3.1 |
| acidity | 3 | 3.1 | 3.2 | 3.1 |
| finish | 3 | 3.3 | 3.2 | 3.1 |
| body feel | 3 | 4.1 | 4.3 | 4.1 |
| foreign smells | absent | absent | absent | absent |

The apple juice roasted bean extract, the grape juice roasted bean extract, and the YM medium roasted bean extract were found to have excellent aroma, being rated higher in brewing aroma and body feel than the control.

C. Evaluating the Coffee Beverage (Canned Black Coffee)

The above extracts were used to prepare canned fermented black coffee.

To prepare the coffee, approximately 200 g of each extract was filtered with a paper filter and sodium bicarbonate was added to the filtered liquid to adjust the pH to approximately 5.7, after which water was used to adjust the Brix to approximately 1.00, and 190 g of this was canned and retort sterilization was performed (125° C., F value: 12).

The four types of canned coffee thus obtained will be referred to as the apple juice canned coffee, the grape juice canned coffee, the YM medium canned coffee, and the control canned coffee.

A sensory analysis was performed on these four canned black coffee types.

C1. Sensory Analysis of the Canned Black Coffee

Analysis was conducted according to the method adopted when analyzing the drip extract. The results are shown in Table 17.

TABLE 17

| evaluated field | control canned coffee | apple juice canned coffee | grape juice canned coffee | YM medium canned coffee |
|---|---|---|---|---|
| brewing aroma | 1 | 4.9 | 5 | 4.8 |
| bitterness | 3 | 3.1 | 3 | 3.2 |
| acidity | 3 | 3 | 3.2 | 3.1 |
| finish | 3 | 3 | 3 | 3 |
| body feel | 3 | 3.4 | 3.5 | 3.4 |
| foreign smells | absent | absent | absent | absent |

The apple juice canned coffee, the grape juice canned coffee, and the YM medium canned coffee exhibited a notable brewing aroma and were not found to include foreign smells. They also had a stronger body feel than the control.

The results from analyzing the above roasted coffee beans and coffee beverages (drip extract and canned black coffee) demonstrate that the aroma and flavor components that were added to the green coffee beans using the method of processing green coffee beans according to the invention were not lost when roasted coffee beans and coffee beverages were produced.

Thus, it was confirmed that the method of processing green coffee beans of the invention allows roasted coffee beans and coffee beverages having rich aromas and flavors to be produced.

INDUSTRIAL APPLICABILITY

The present invention has exceptional utility in not only processing tasks such as refining and roasting coffee berries, but also in the task of manufacturing coffee beverages by manufacturing various types of products (regular coffee, instant coffee, canned coffee, coffee aroma, etc.) from roasted coffee beans produced from green coffee beans that have been processed according to the invention, and can contribute to the further development of those industries.

Figure 1:
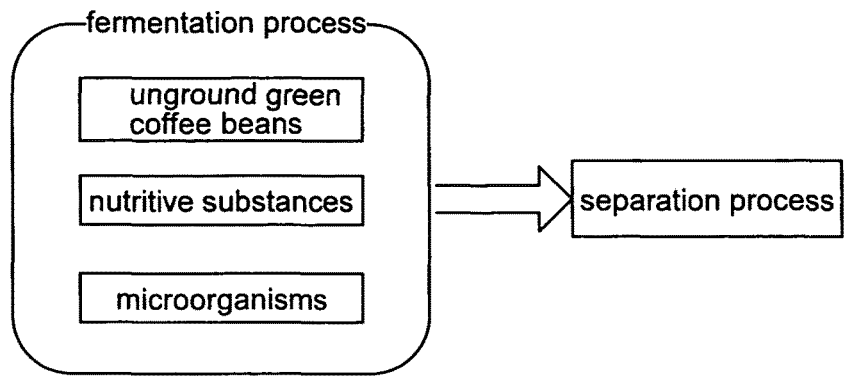
FIG. 1 is a schematic of the method of processing green coffee beans of the invention.
Figure 2:
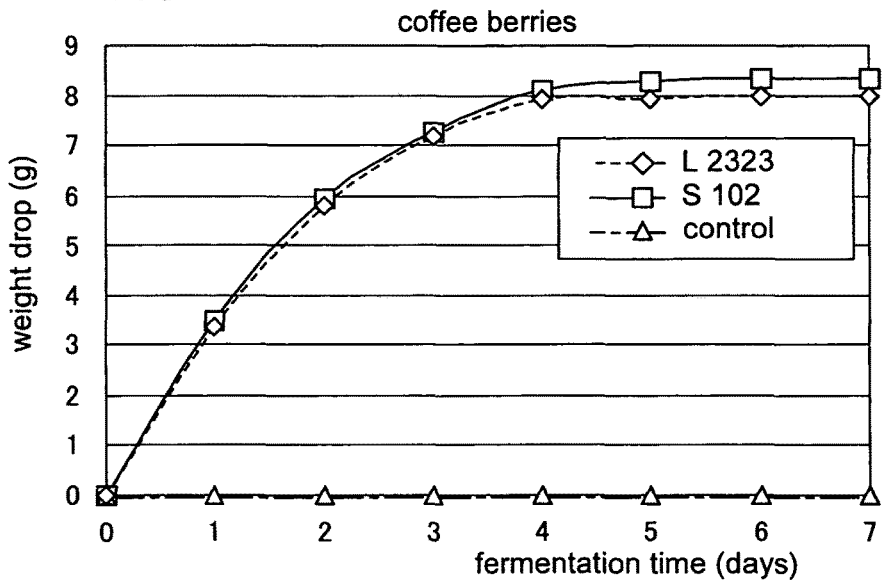
FIG. 2 is a graph showing the drop in weight when yeast is brought into contact with undried coffee berries.
Figure 3:
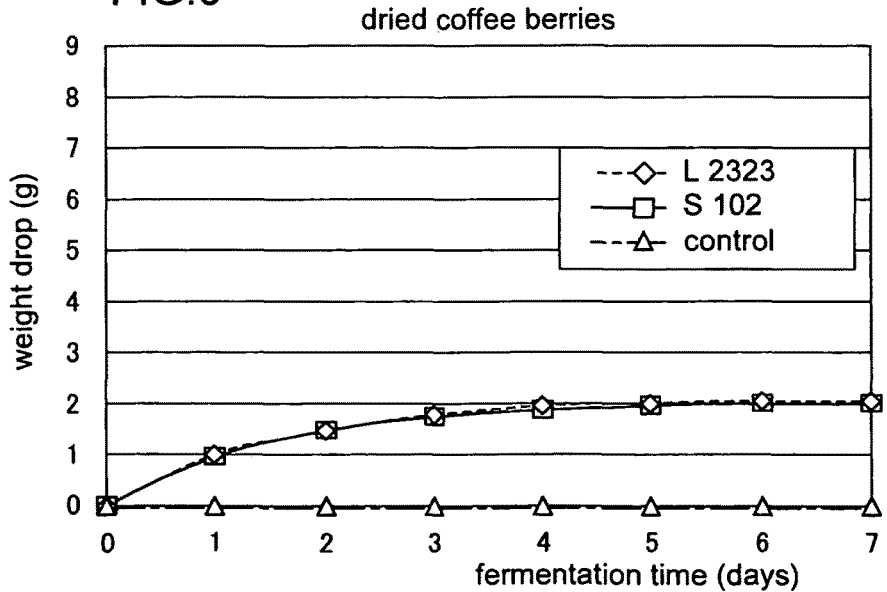
FIG. 3 is a graph showing the drop in weight when yeast is brought into contact with dried coffee berries.

The invention claimed is:

1. A method of manufacturing green coffee beans to which brewing aroma is added, comprising:
a fermentation process of bringing green coffee beans, which are unground seeds from coffee berries, a yeast suspension containing brewers yeast in an amount of $1.0 \times 10^8$ cells/g-$1.0 \times 10^{10}$ cells/g weight of unground green coffee bean, and a nutritive substance comprising at least one of fruit juice and fruit pulp, the nutritive substance being metabolized by said brewers yeast, into contact with one another to cause alcoholic fermentation under an environment prohibiting infiltration by various bacteria and allowing the temperature and the concentration of carbon dioxide to be controlled for at least 48 hours, to allow the green coffee beans to absorb brewing aroma of at least one of alcohols and esters produced by the fermentation and enhance the brewing aroma of the green coffee beans; and
a separation process of separating out only said green coffee beans that have passed through the fermentation process.

2. A method of manufacturing roasted coffee beans to which brewing aroma is added, comprising:
a fermentation Process of bringing green coffee beans, which are unground seeds from coffee berries, a yeast suspension containing brewers yeast in an amount of $1.0 \times 10^8$ cells/g-$1.0 \times 10^{10}$ cells/g weight of unground green coffee bean, and a nutritive substance comprising at least one of fruit juice and fruit pulp, the nutritive substance being metabolized by said brewers yeast, into contact with one another to cause an environment prohibiting infiltration by various bacteria and allowing the temperature and the concentration of carbon dioxide to be controlled alcoholic fermentation under a carbon dioxide atmosphere for at least 48 hours, to allow the green coffee beans to absorb brewing aroma of at least one of alcohols and esters produced by the fermentation and enhance the brewing aroma of the green coffee beans;
a separation process of separating out only said green coffee beans that have passed through the fermentation process; and
a roasting process of roasting said green coffee beans that have been obtained in said separation process.

3. A method of manufacturing coffee drip extract to which brewing aroma is added, comprising:
a fermentation process of bringing green coffee beans, which are unground seeds from coffee berries, a yeast suspension containing brewers yeast in an amount of $1.0 \times 10^8$ cells/g-$1.0 \times 10^{10}$ cells/g weight of unground green coffee bean, and a nutritive substance comprising at least one of fruit juice and fruit pulp, the nutritive substance being metabolized by said brewers yeast, into contact one another to cause alcoholic fermentation an environment prohibiting infiltration by various bacteria and allowing the temperature and the concentration of carbon dioxide to be controlled for at least 48 hours, to allow the green coffee beans to absorb brewing aroma of at least one of alcohols and esters produced by the fermentation and enhance the brewing aroma of the green coffee beans;
a separation process of separating out only said green coffee beans that have passed through the fermentation process;
a roasting process of roasting green coffee beans that have been obtained in said separation process to obtain roasted coffee beans to which brewing aroma is added;
a filtering and extracting process of grinding up and adding water to the roasted coffee beans to which brewing aroma is added, then extracting said water by filtration with a filter.

4. A method of manufacturing a canned coffee beverage, comprising:
a fermentation process of bringing green coffee beans, which are unground seeds from coffee berries, a yeast suspension containing brewers yeast in an amount of $1.0 \times 10^8$ cells/g-$1.0 \times 10^{10}$ cells/g weight of unground green coffee bean, and a nutritive substance comprising at least one of fruit juice and fruit pulp, the nutritive substance being metabolized by said brewers yeast, into contact with one another to cause alcoholic fermentation under an environment prohibiting infiltration by various bacteria and allowing the temperature and the concentration of carbon dioxide to be for at least 48 hours, to allow the green coffee beans to absorb brewing aroma of at least one of alcohols and esters produced by the fermentation and enhance the brewing aroma of the green coffee beans;

a separation process of separating out only said green coffee beans that have passed through the fermentation process;

a roasting process of roasting green coffee beans that have been obtained in said separation process to obtain roasted coffee beans to which brewing aroma is added;

a filtering and extracting process of grinding up and adding water to the roasted coffee beans to which brewing aroma is added, then extracting said water by filtration with a filter; and a heat sterilizing process of filling a container with a drip extract that has been obtained through said extracting process, followed by heating and sterilization.

5. The method of manufacturing roasted coffee beans according to claim 2, wherein said nutritive substance comprises coffee pulp.

6. The method of claim 1, wherein the temperature and concentration of carbon dioxide are controlled via one of an incubator, tank, or storage house.

* * * * *

UNITED STATES PATENT AND TRADEMARK OFFICE
CERTIFICATE OF CORRECTION

PATENT NO. : 9,867,385 B2  
APPLICATION NO. : 10/573373  
DATED : January 16, 2018  
INVENTOR(S) : Kenzo Takahashi et al.

It is certified that error appears in the above-identified patent and that said Letters Patent is hereby corrected as shown below:

Column 24, Line 6, Claim 2, delete "Process" and insert -- process --

Column 24, Line 66, Claim 4, after "be" insert -- controlled --

Signed and Sealed this  
Twelfth Day of June, 2018

Andrei Iancu  
*Director of the United States Patent and Trademark Office*